United States Patent
Liu et al.

(10) Patent No.: US 9,692,783 B2
(45) Date of Patent: Jun. 27, 2017

(54) METHOD AND APPARATUS FOR REPORTING A VIRUS

(71) Applicant: TENCENT TECHNOLOGY (SHENZHEN) COMPANY LIMITED, Shenzhen (CN)

(72) Inventors: Yongxian Liu, Shenzhen (CN); Qiyuan Meng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 92 days.

(21) Appl. No.: 14/693,505

(22) Filed: Apr. 22, 2015

(65) Prior Publication Data

US 2015/0229652 A1 Aug. 13, 2015

Related U.S. Application Data

(63) Continuation of application No. PCT/CN2013/084822, filed on Oct. 8, 2013.

(30) Foreign Application Priority Data

Oct. 24, 2012 (CN) .......................... 2012 1 0410025

(51) Int. Cl.
G06F 11/00 (2006.01)
G06F 12/14 (2006.01)
(Continued)

(52) U.S. Cl.
CPC ............ *H04L 63/145* (2013.01); *G06F 21/56* (2013.01); *G06F 21/567* (2013.01); *H04L 63/1416* (2013.01); *H04L 67/12* (2013.01)

(58) Field of Classification Search
None
See application file for complete search history.

(56) References Cited

U.S. PATENT DOCUMENTS

| 7,096,501 B2 * | 8/2006 | Kouznetsov | ............ G06F 21/56 713/191 |
| 7,171,690 B2 * | 1/2007 | Kouznetsov | ............ G06F 21/56 726/22 |

(Continued)

FOREIGN PATENT DOCUMENTS

| CN | 1889773 A | 1/2007 |
| CN | 101098226 A | 1/2008 |

(Continued)

OTHER PUBLICATIONS

International Preliminary Report and Written Opinion of the International Searching Authority for International Application No. PCT/CN2013/084822, mailed May 7, 2015, in 7 pages.

(Continued)

*Primary Examiner* — Farid Homayounmehr
*Assistant Examiner* — Olanrewaju Bucknor
(74) *Attorney, Agent, or Firm* — Knobbe Martens Olson & Bear LLP

(57) ABSTRACT

According to an example, a client device determines at least one virus sample according to at least one anti-virus engine, transmits sample information of the at least one virus sample to a server, such that the server determines a first virus sample set needs to be reported according to the sample information of the at least one virus sample and a predefined sample information list in the server, and returns to the first virus sample set to the client device. The client device receives the first virus sample set needs to be reported and performs a virus reporting operation according to the virus sample set.

7 Claims, 5 Drawing Sheets

(51) Int. Cl.
*H04L 29/06* (2006.01)
*H04L 29/08* (2006.01)
*G06F 21/56* (2013.01)

(56) References Cited

U.S. PATENT DOCUMENTS

| | | | |
|---|---|---|---|
| 7,237,008 B1* | 6/2007 | Tarbotton | G06Q 10/107 709/206 |
| 7,640,589 B1 | 12/2009 | Mashevsky et al. | |
| 7,756,834 B2* | 7/2010 | Masters | G06F 21/568 707/640 |
| 8,321,941 B2* | 11/2012 | Tuvell | G06F 21/56 726/24 |
| 2002/0116639 A1* | 8/2002 | Chefalas | G06F 21/56 726/24 |
| 2005/0050336 A1* | 3/2005 | Liang | G06F 21/56 713/188 |
| 2009/0282485 A1* | 11/2009 | Bennett | G06F 21/51 726/24 |
| 2010/0257609 A1* | 10/2010 | Niemel | G06F 21/56 726/24 |
| 2012/0002839 A1* | 1/2012 | Niemela | G06K 9/00973 382/100 |
| 2012/0079596 A1* | 3/2012 | Thomas | G06F 21/55 726/24 |
| 2012/0084859 A1 | 4/2012 | Radinsky et al. | |
| 2012/0167219 A1 | 6/2012 | Zaitsev et al. | |
| 2012/0233696 A1 | 9/2012 | Zeng et al. | |
| 2012/0297486 A1* | 11/2012 | Turbin | G06F 21/566 726/24 |
| 2013/0167236 A1* | 6/2013 | Sick | G06F 21/552 726/24 |

FOREIGN PATENT DOCUMENTS

| | | |
|---|---|---|
| CN | 101308533 A | 11/2008 |
| CN | 101827096 A | 9/2010 |
| CN | 101901314 A | 12/2010 |
| CN | 102222192 A | 10/2011 |
| CN | 102469146 A | 5/2012 |
| CN | 102509039 A | 6/2012 |
| CN | 102592103 A | 7/2012 |
| CN | 102685069 A | 9/2012 |

OTHER PUBLICATIONS

Extended European Search Report for European Patent Application No. 13848336.7, dated Sep. 28, 2015, in 6 pages.
International Search Report for International Application No. PCT/CN2013/084822, mailed on Jan. 16, 2014.
Office Action Issued in Chinese Patent Application 201210410025.X, dated Apr. 27, 2016, 9 pages.
Office Action Issued in Chinese Patent Application No. 201210410025.X dated Nov. 30, 2016, in 11 pages.

* cited by examiner

METHOD AND APPARATUS FOR REPORTING A VIRUS

CROSS-REFERENCE TO RELATED APPLICATIONS

This application is a continuation of International Application No. PCT/CN2013/084822, filed on Oct. 8, 2013. This application claims the benefit and priority of Chinese Patent Application No. 201210410025.X, filed Oct. 24, 2012. The entire disclosures of each of the above applications are incorporated herein by reference.

FIELD

The present disclosure relates to computer fields, and more particularly, to a method and an apparatus for reporting a virus.

BACKGROUND

With the development of Internet applications, various kinds of requirements of users are met by the Internet. At the same time, a variety of viruses and Trojans may infect computers of the users and threaten the security of the users. Security software and anti-virus software have always been committed to fight against various threatens. The network environment is getting better and better. But on the other hand, the security software and the anti-virus software have an erroneous reporting problem which will bring out troubles to the users. It may result in crash of the software, or even running abnormal of a system. The existence of the erroneous reporting threatens the security of the system and affects the normal usage of the user. Therefore, while improving the ability of the software, it is an urgent problem to control the erroneous reporting.

SUMMARY

According to an example of the present disclosure, a method for reporting a virus is provided. The method includes:

determining, by a client device, at least one virus sample according to at least one anti-virus engine;

transmitting, by the client device, sample information of the at least one virus sample to a server, such that the server determines a first virus sample set needs to be reported according to the sample information of the at least one virus sample and a predefined sample information list in the server, and returns to the first virus sample set to the client device;

receiving, by the client device, the first virus sample set needs to be reported; and performing a virus reporting operation according to the virus sample set.

According to an example of the present disclosure, a method for reporting a virus is provided. The method includes:

receiving, by a server, sample information of at least one virus sample transmitted by a client device:

determining, by the server, a first virus sample set according to the sample information of the at least one virus sample and a predefined sample information list in the server; and transmitting, by the server, the first virus sample set to the client device, such that the client device performs a virus reporting operation according to the virus sample set.

According to another example of the present disclosure, an apparatus for reporting a virus is provided. The apparatus includes:

one or more processors;

a memory; and one or more program modules stored in the memory and to be executed by the one or more processors, the one or more program modules include:

a virus sample determining module, adapted to determine at least one virus sample according to at least one anti-virus engine;

a transmitting module, adapted to transmit sample information of the at least one virus sample to a server, such that the server determines a first virus sample set needs to be reported according to the at least one virus sample and a predefined sampling information list in the server, and returns the first virus sample set to the client device;

a receiving module, adapted to receive the first virus sample set needs to be reported; and a reporting module, adapted to perform a virus reporting operation according to the virus sample set.

Other aspects or embodiments of the present disclosure can be understood by those skilled in the art in light of the description, the claims, and the drawings of the present disclosure.

BRIEF DESCRIPTION OF THE DRAWINGS

Features of the present disclosure are illustrated by way of example and not limited in the following figures, in which like numerals indicate like elements, in which.

DETAILED DESCRIPTION

The preset disclosure will be described in further detail hereinafter with reference to accompanying drawings and examples to make the technical solution and merits therein clearer.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Figure 1:
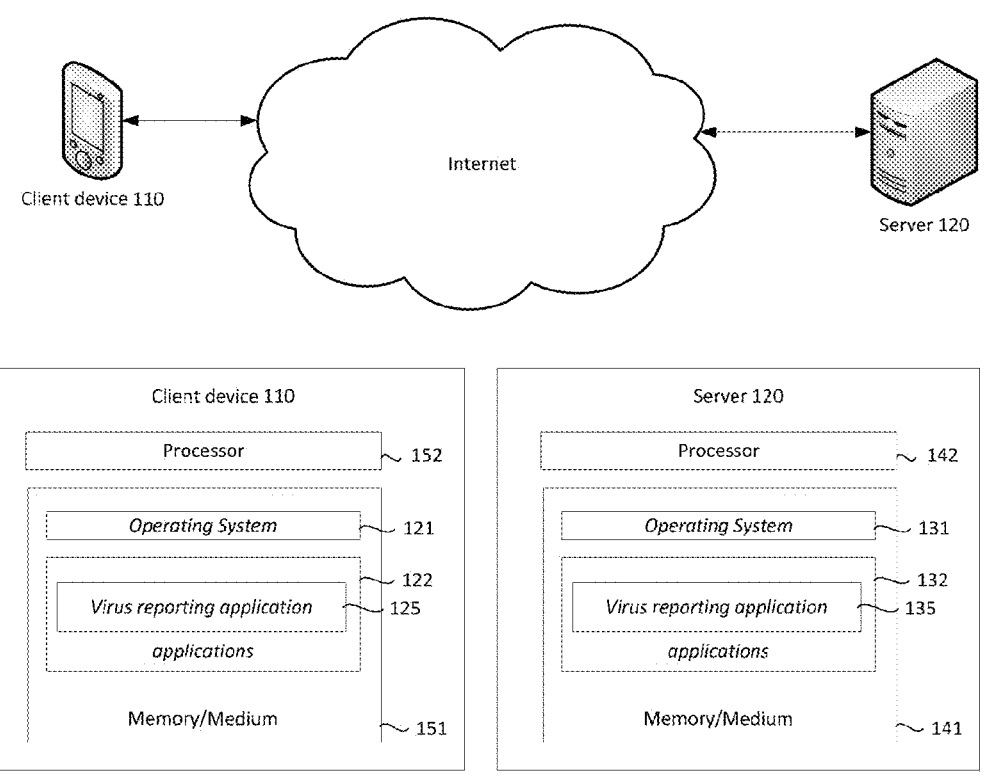
FIG. 1 is a schematic diagram illustrating an example embodiment of a computer system.

In an example embodiment of a computer system that may execute methods and software apparatuses of the present application. FIG. 1 is a schematic diagram illustrating an example embodiment of a computer system. As shown in FIG. 1, the computer system includes a client device 110 and a server 120.

The client device 110 may be a computing device capable of executing a method and apparatus of the present disclosure. The client device 110 may, for example, be a device such as a personal desktop computer or a portable device, such as a laptop computer, a tablet computer, a cellular telephone, or a smart phone.

The client device 110 may include one or more non-transitory processor-readable storage media such as a memory/medium 151 and one or more processors 152 in communication with the memory/medium 151. The client device 110 may also include or may execute an operating system 121 and a variety of applications 122, such as a virus reporting application 125 executable by a processor to implement the methods provided by the present disclosure.

The server 120 in FIG. 1 represents a computer system that is made available to the client device 110. The server 120 may include one or more non-transitory processor-readable storage media such as a memory/medium 141 and one or more processors 142 in communication with the memory/medium 141. The server 120 may include or may execute an operating system 131 and a variety of applications 132, such as a virus reporting application 135 executable by a processor to implement the methods provided by the present disclosure.

The memory/medium 151 and 141 may be a RAM memory, flash memory, ROM memory, EPROM memory, EEPROM memory, registers, hard disk, a removable disk, a CD-ROM, or any other form of non-transitory storage medium known in the art.

Figure 2:
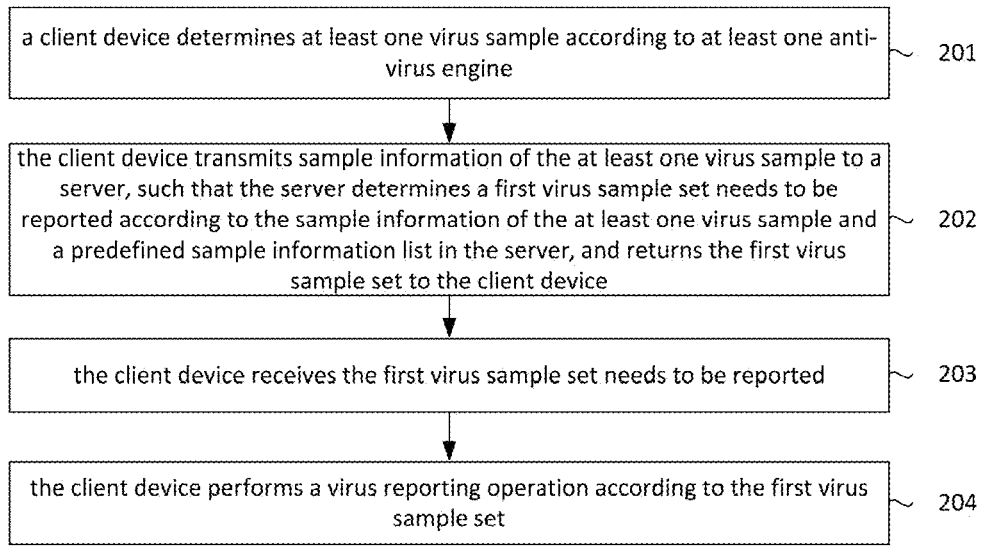
FIG. 2 is a flowchart illustrating a method for reporting a virus according to an example of the present disclosure.

FIG. 2 is a flowchart illustrating a method for reporting a virus according to an example of the present disclosure. FIG. 2 is a simplified diagram according to one embodiment of the present invention. This diagram is merely an example, which should not unduly limit the scope of the claims. One of ordinary skill in the art would recognize many variations, alternatives, and modifications.

As shown in FIG. 2, the method includes at least the following processes.

At block 201, a client device determines at least one virus sample according to at least one anti-virus engine.

The anti-virus engine is a technical mechanism for determining whether a program is a virus program or a suspicious virus program. The anti-virus engine is an important part of anti-virus software. It is a program for detecting and finding a virus.

In examples of the present disclosure, the virus sample refers to a virus carried by a suspicious file determined by the anti-virus engine.

The at least one anti-virus engine may scan files in the client device in series or in parallel.

At block 202, the client device transmits sample information of the at least one virus sample to a server, such that the server determines a first virus sample set needs to be reported according to the sample information of the at least one virus sample and a predefined sample information list in the server, and returns the first virus sample set to the client device.

In this example, the server may be a cloud server providing services to the client device. The sample information of the virus sample may include name, description information or characteristic value of the virus sample. For example, the sample information of the virus sample may be a MD5 value of the virus sample. Each virus sample has a piece of corresponding sample information which uniquely identifies the virus sample. It should be noted that, the characteristic value may be obtained via MD5 algorithm or other algorithms, which is not restricted in the present disclosure.

The virus sample set obtained is not the virus sample itself but the sample information of the virus sample. For simplifying the description, it is referred to as the virus sample set.

It should be noted that, the predefined sample information list may be configured in the server manually. The predefined sample information list may be used for determining the virus sample set needs to be reported. In particular, the predefined sample information set includes the sample information of the virus sample needs to be reported.

At block 203, the client device receives the first virus sample set needs to be reported.

After the server determines the first virus sample set needs to be reported and returns the first virus sample set to the client device, the client device receives the first virus sample set.

At block 204, the client device performs a virus reporting operation according to the first virus sample set.

For the client device, when receiving the first virus sample set needs to be reported, the client device may perform a virus reporting/prompting operation according to first virus sample set needs to be reported, e.g., pop out a prompt box to prompting the user of the virus sample searched out and provide a processing method for selection of the user.

Block 204 may specifically include: according to the sample information in the virus sample set obtained, performing a virus reporting operation to the virus sample corresponding to the sample information.

In this block, the client device may perform the virus reporting operation according to the virus sample set and a predefined policy in the client device. The predefined policy may include: performing the virus reporting operation according to a predefined trust level of each anti-virus engine. For a virus reported by an anti-virus engine with a high trust level (e.g., the trust level reaches a predetermined threshold), the virus may be directed reported. The policy and the threshold may be configured in the client device according to a practical requirement.

In the virus reporting method provided by the example of the present disclosure, the client device determines at least one virus sample according to at least one anti-virus engine, transmits the sample information of the at least one virus sample to the server, such that the server determines, according to the sample information of the at least one virus sample and a predefined sample information list in the server, the first virus sample set needs to be reported and transmits the first virus sample set to the client device. The client device receives the first virus sample set needs to be reported and performs a virus reporting operation according to the virus sample set received. According to the above solution, the determined virus sample is reported to the server. Thus, it is possible to determine the virus sample set needs to be reported according to the predefined sample information list in the server. Then the reporting operation may be performed according to the virus sample set. The solution combines the anti-virus engine in the server and the anti-virus engine in the client device. The virus sample determined by the client device is determined by the server again, which reduces erroneous reporting and improves virus reporting ability of the client device.

Figure 3:
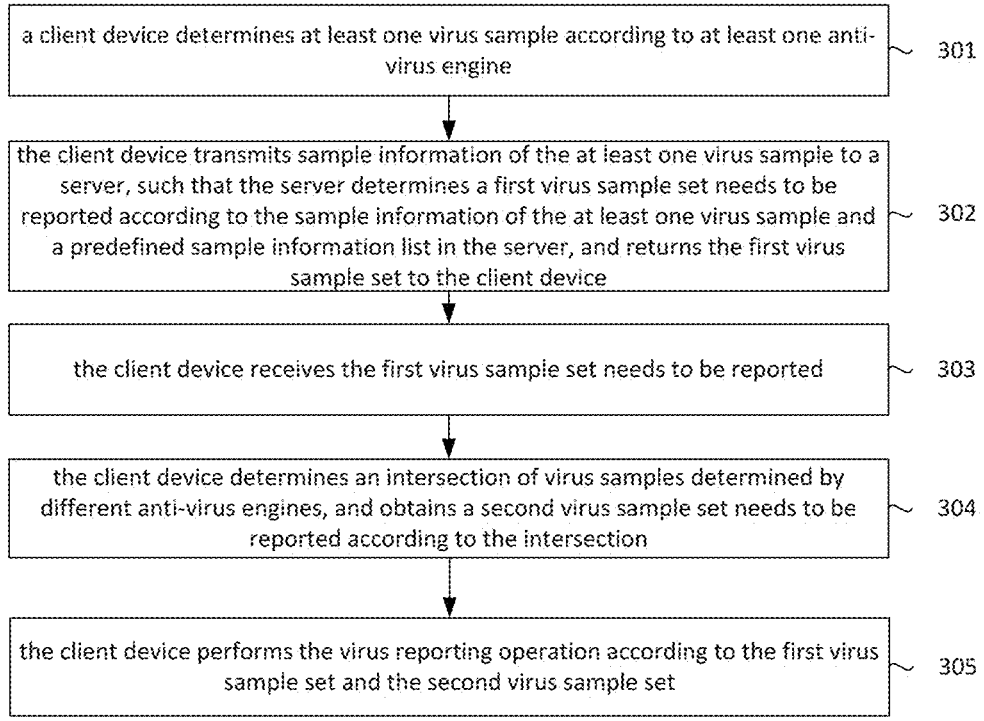
FIG. 3 is a flowchart illustrating a method for reporting a virus according to another example of the present disclosure.

FIG. 3 is a flowchart illustrating a method for reporting a virus according to another example of the present disclosure.

As shown in FIG. 3, the method includes the following operations.

Blocks 301 to 303 are respectively the same with blocks 201 to 203 as shown in FIG. 2.

At block 304, the client device determines an intersection of virus samples determined by different anti-virus engines, and obtains a second virus sample set needs to be reported according to the intersection.

Thus, after the server determines the first virus sample set needs to be reported in block 302, the client device further determines a second virus sample set. Through obtaining the intersection of the virus samples determined by different anti-virus engines, files which are less suspicious are removed, which further avoids erroneous reporting.

At block 305, the client device performs the virus reporting operation according to the first virus sample set and the second virus sample set.

Figure 4:
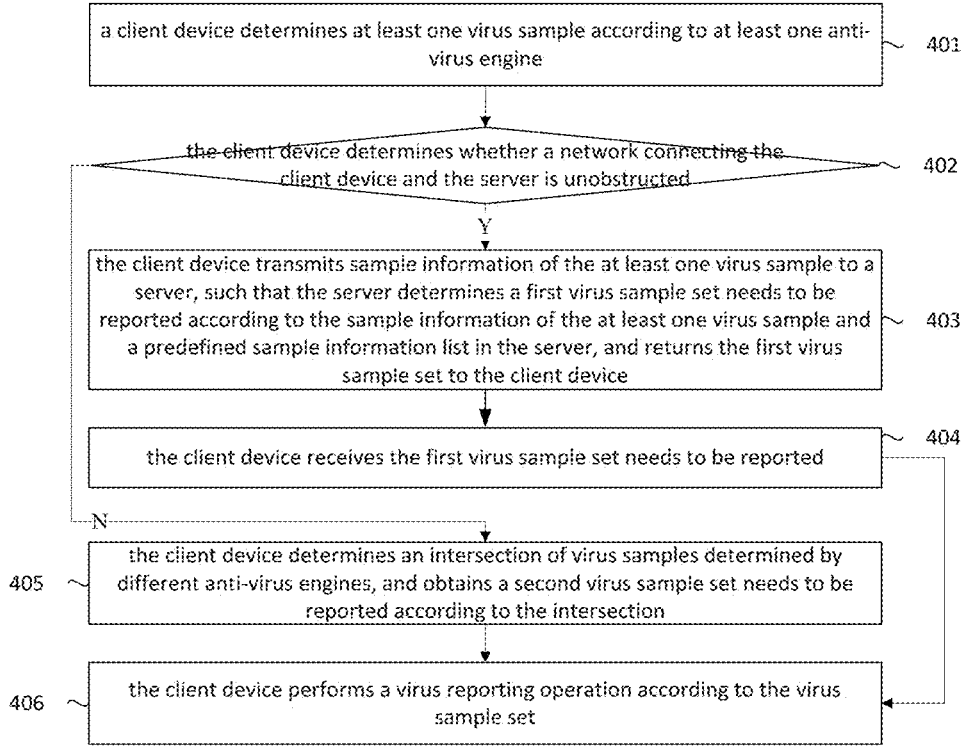
FIG. 4 is a flowchart illustrating a method for reporting a virus according to still another example of the present disclosure.

FIG. 4 is a flowchart illustrating a method for reporting a virus according to still another example of the present disclosure.

As shown in FIG. 4, the method includes the following operations.

Block 401 is the same as block 201.

At block 402, the client device determines whether a network connecting the client device and the server is unobstructed. If the network is unobstructed, block 403 is performed; otherwise, block 405 is performed.

In this block, those with ordinary skill may know various methods to determine whether the network is unobstructed. For example, two exemplary methods are listed below.

In a first method, it is determined whether a network transmission speed of the client device is higher than a predefined threshold. If yes, it is determined that the network is unobstructed; otherwise, it is determined that the network is obstructed.

In a second method, the client device transmits an Internet Control Message Protocol (IGMP) packet to a designated device. If the device receives the IGMP packet within a predefined time interval, it is determined that the network is unobstructed; otherwise, it is determined that the network is obstructed.

Those with ordinary skill in the art may determine whether the network is unobstructed via other methods, which is not restricted in the present disclosure.

Blocks 403 to 405 are respectively the same with blocks 302 and 304.

At block 406, the client device performs a virus reporting operation according to the virus sample set.

In this block, if the network is obstructed, the client device performs the virus reporting operation according to the second virus sample set determined by the client device according to the intersection determined by the anti-virus engines. If the network is unobstructed, the client device performs the virus reporting operation according to the first virus sample set and the second virus sample set.

In the virus reporting method provided by the example of the present disclosure, the client device determines at least one virus sample according to at least one anti-virus engine, transmits the sample information of the at least one virus sample to the server, such that the server determines, according to the sample information of the at least one virus sample and a predefined sample information list in the server, the first virus sample set needs to be reported and transmits the first virus sample set to the client device. The client device receives the first virus sample set needs to be reported and performs a virus reporting operation according to the virus sample set received. According to the above solution, the determined virus sample is reported to the server. Thus, it is possible to determine the virus sample set needs to be reported according to the predefined sample information list in the server. Then the reporting operation may be performed according to the virus sample set. The solution combines the anti-virus engine in the server and the anti-virus engine in the client device. The virus sample determined by the client device is determined by the server again, which reduces erroneous reporting and improves virus reporting ability of the client device.

Furthermore, if the network is obstructed, the client device scans one sample using multiple anti-virus engines. Through the multiple determinations of the anti-virus engines, it is determined whether to report the virus to the user. Thus, erroneous reporting may be reduced whether the network is usable or not. The virus-reporting policy can be configured flexibly.

It should be noted that, the determination of the intersection may be performed before the client device transmits the sample information of the at least one virus sample to the server, or after the client device transmits the sample information to the server, or after the client device receives the first virus sample set. It is not restricted in the present disclosure.

Figure 5:
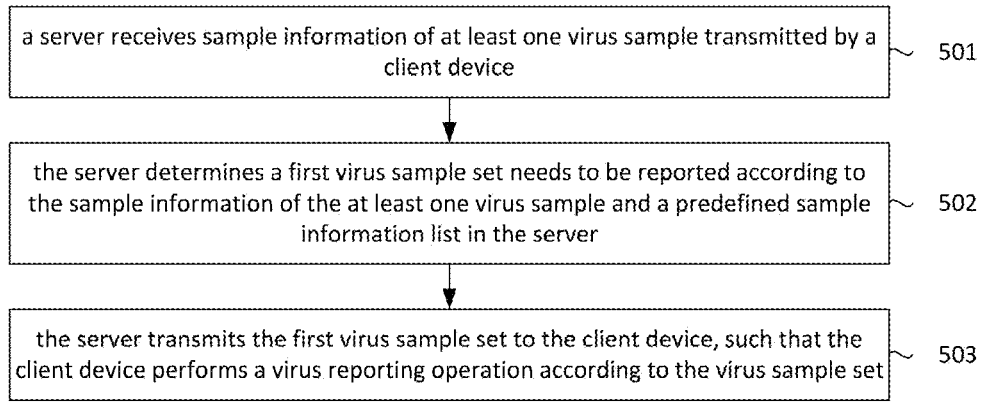
FIG. 5 is a flowchart illustrating a method for reporting a virus at a server side according to an example of the present disclosure.

FIG. 5 is a flowchart illustrating a method for reporting a virus at a server side according to an example of the present disclosure.

As shown in FIG. 5, the method includes the following operations.

At block 501, a server receives sample information of at least one virus sample transmitted by a client device.

In this block, the server may be a cloud server providing services for the client device. The sample information of the virus sample may include name, description information or characteristic value of the virus sample. For example, the sample information of the virus sample may be a MD5 value of the virus sample. Each virus sample has a piece of corresponding sample information which uniquely identifies the virus sample. It should be noted that, the characteristic value may be obtained via MD5 algorithm or other algorithms, which is not restricted in the present disclosure.

At block 502, the server determines a first virus sample set needs to be reported according to the sample information of the at least one virus sample and a predefined sample information list in the server.

The predefined sample information list may be configured in the server manually. The predefined sample information list may be used for determining the virus sample set needs to be reported. In particular, the predefined sample information set includes the sample information of the virus sample needs to be reported.

It should be noted that, the sample information list may further include sample information of a virus sample which is not needed to be reported.

In this block, the predefined sample information list may include a white list and a black list. Thus, this block may specifically include: if the sample information of the at least one virus sample includes sample information of a first virus sample in the white list, the first virus sample needs not to be reported. If the sample information of the at least one virus sample includes sample information of a second virus sample in the black list, the second virus sample is put into the first virus sample set.

It should be noted that, the black list needs to include the sample information of the virus sample needs to be reported, but the white list may not include the sample information of the virus sample which needs not to be reported.

The server may inquires the white list and the black list of the predefined sample information list according to the sample information of the at least one virus sample received. If the sample information of the at least one virus sample includes the sample information of the first virus sample in the white list, the first virus sample needs not to be reported. If the sample information of the at least one virus sample includes the sample information of the second virus sample in the black list, the second virus sample is put into the first virus sample set.

At block 503, the server transmits the first virus sample set to the client device, such that the client device performs a virus reporting operation according to the virus sample set.

After receiving the first virus sample set needs to be reported, the client device may perform a virus reporting/prompting operation according to first virus sample set needs to be reported, e.g., pop out a prompt box to prompting the user of the virus sample searched out and provide a processing method for selection of the user.

It should be noted that, the virus sample set obtained is not the virus sample itself but the sample information of the virus sample. For simplifying the description, it is referred to as virus sample set.

According to the solution of the present disclosure, the client device transmits a determined virus sample to the server. The server determines the virus sample set needs to be reported according to the predefined sample information list. Thus, the client device is capable of performing the reporting operation according to the virus sample set. The solution combines the anti-virus engine at both the server side and the client device side. The virus sample determined by the client device is determined by the server again, which reduces erroneous reporting and improves virus reporting ability of the client device.

Figure 6:
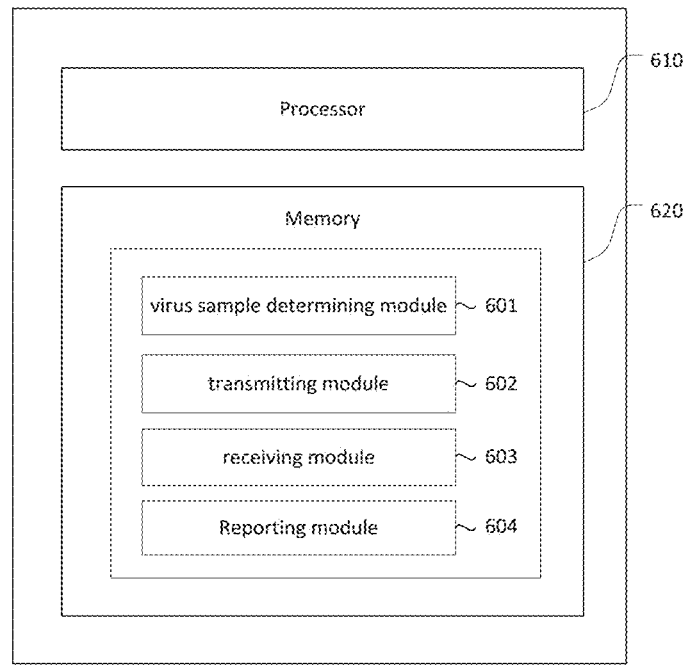
FIG. 6 is a schematic diagram illustrating a client device for reporting a virus according to another example of the present disclosure.

FIG. 6 is a schematic diagram illustrating a client device according to an example of the present disclosure. As shown in FIG. 6, the client device includes: one or more processors 610 and a memory 620, wherein one or more program modules are stored in the memory 620 and to be executed by the one or more processors 610, the one or more program modules include a virus sample determining module 601, a transmitting module 602, a receiving module 603 and a reporting module 604.

The virus sample determining module 601 is adapted to determine at least one virus sample according to at least one anti-virus engine.

The transmitting module 602 is adapted to transmit sample information of the at least one virus sample to a server, such that the server determines a first virus sample set needs to be reported according to the at least one virus sample and a predefined sampling information list in the server, and returns the first virus sample set to the client device.

The receiving module 603 is adapted to receive the first virus sample set needs to be reported.

The reporting module 604 is adapted to perform a virus reporting operation according to the first virus sample set.

Figure 7:
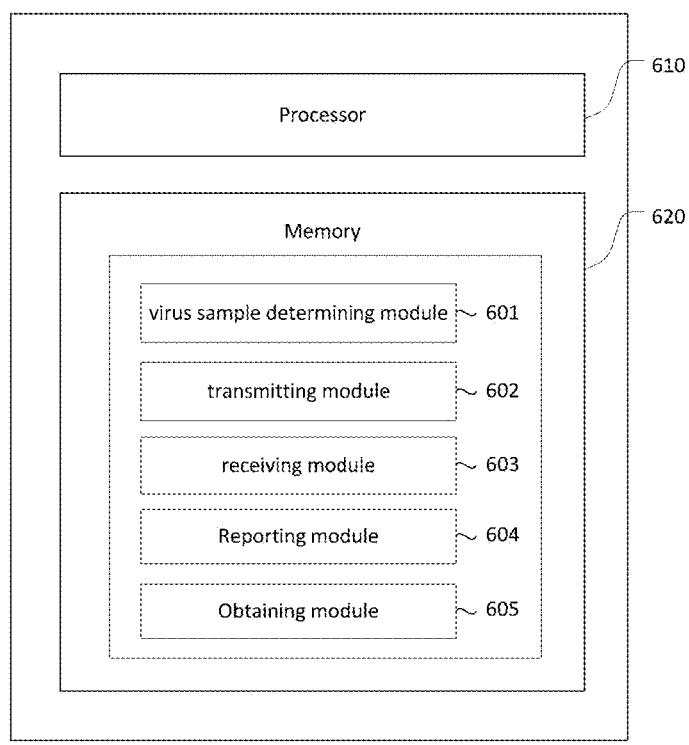
FIG. 7 is a schematic diagram illustrating a client device for reporting a virus according to another example of the present disclosure.

FIG. 7 is a schematic diagram illustrating a client device according to another example of the present disclosure. As shown in FIG. 7, based on the client device in FIG. 6, the client device in FIG. 7 further includes an obtaining module 605, adapted to determine an intersection of virus samples determined by multiple anti-virus engines of the client device, and determine a second virus sample set according to the intersection.

At this time, the reporting module 604 is further adapted to perform the virus reporting operation according to the first virus sample set and the second virus sample set.

Figure 8:
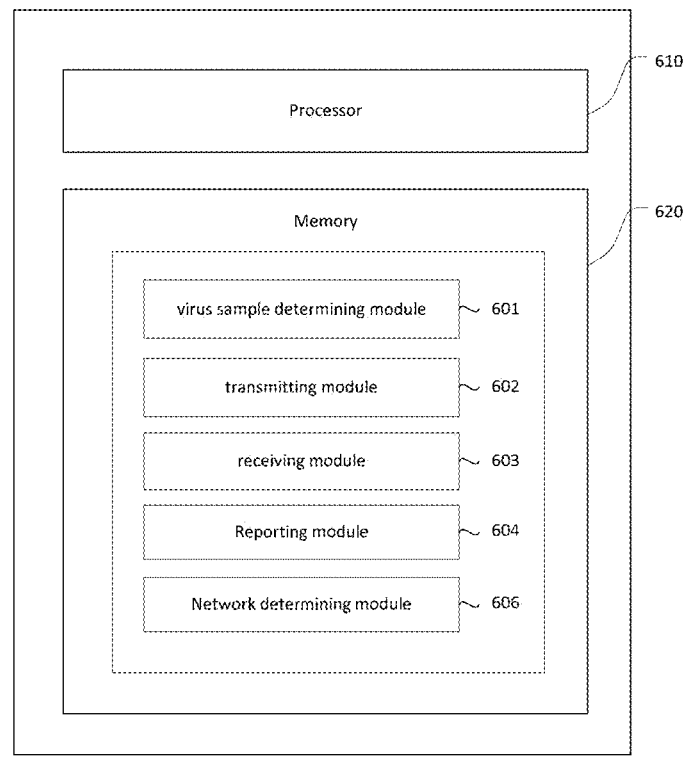
FIG. 8 is a schematic diagram illustrating a client device for reporting a virus according to still another example of the present disclosure.

FIG. 8 is a schematic diagram illustrating a client device according to still another example of the present disclosure. As shown in FIG. 8, the client device further includes a network determining module 606, adapted to determine whether a network connecting the client device and the server is unobstructed, trigger the transmitting module 602 to transmit the sample information of the at least one virus sample to the server if it is determined that the network is unobstructed.

In addition to the first and second virus sample sets, the client device may perform the virus reporting operation further according to a predefined policy. The policy has been described in the above method examples and is not repeated herein.

In this example, the processor 610 may execute the program modules in the memory 620 to further execute all or some of the processes described in the above method examples, which is not repeated herein.

Figure 9:
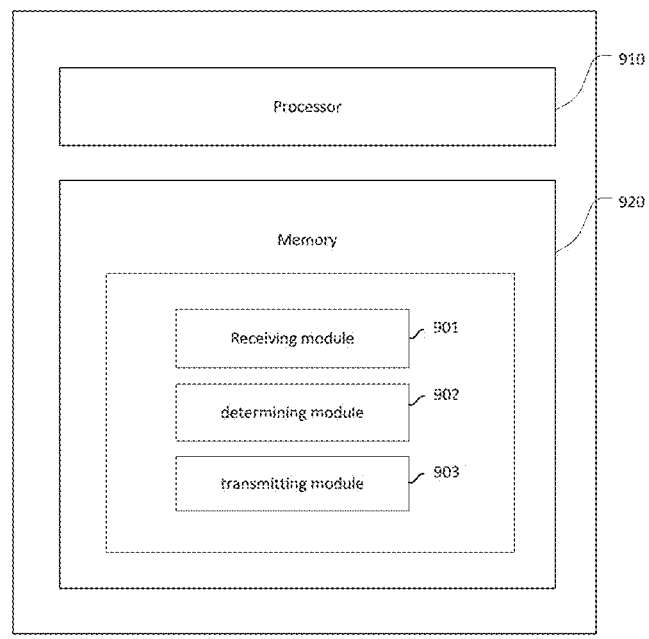
FIG. 9 is a schematic diagram illustrating a server for reporting a virus according to an example of the present disclosure.

FIG. 9 is a schematic diagram illustrating a server according to an example of the present disclosure. As shown in FIG. 9, the server includes one or more processors 910 and a memory 920, wherein one or more program modules are stored in the memory 920 and to be executed by the one or more processors 910, the one or more program modules include: a receiving module 901, a determining module 902, and a transmitting module 903.

The receiving module 901 is adapted to receive sample information of at least one virus sample transmitted by a client device.

The determining module 902 is adapted to determine a first virus sample set needs to be reported according to the sample information of the at least one virus sample and a predefined sample information list in the server.

The transmitting module 903 is adapted to transmit the first virus sample set to the client device, such that the client device performs a virus reporting operation according to the first virus sample set.

In this example, the processor 910 may execute the program modules in the memory 920 to further execute all or some of the processes described in the above method examples, which is not repeated herein.

In the virus reporting method provided by the example of the present disclosure, the client device determines at least one virus sample according to at least one anti-virus engine, transmits the sample information of the at least one virus sample to the server, such that the server determines, according to the sample information of the at least one virus sample and a predefined sample information list in the server, the first virus sample set needs to be reported and transmits the first virus sample set to the client device. The client device receives the first virus sample set needs to be reported and performs a virus reporting operation according to the virus sample set received. According to the above solution, the determined virus sample is reported to the server. Thus, it is possible to determine the virus sample set needs to be reported according to the predefined sample information list in the server. Then the reporting operation may be performed according to the virus sample set. The solution combines the anti-virus engine in the server and the anti-virus engine in the client device. The virus sample determined by the client device is determined by the server again, which reduces erroneous reporting and improves virus reporting ability of the client device.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for reporting a virus, comprising:
   determining, by a client device, at least one virus sample according to different anti-virus engines;
   determining, by the client device, whether a network connecting the client device and a server is unobstructed;
   if the network is unobstructed, transmitting, by the client device, sample information of the at least one virus sample to a server, wherein the server determines a first virus sample set to be reported according to the sample information of the at least one virus sample and a predefined sample information list in the server, and returns to the first virus sample set to the client device; wherein the predefined sample information list comprises a white list and a black list; if the sample information of the at least one virus sample comprises sample information of a first virus sample in the white list, the server determines that the first virus sample is not to be reported; and if the sample information of the at least one virus sample comprises sample information of a second virus sample in the black list, the server determines the second virus sample is to be reported and puts the second virus sample into the first virus sample set;
   receiving, by the client device, the first virus sample set to be reported; and performing a virus reporting operation according to the first virus sample set;
   if the network is obstructed, determining, by the client device, an intersection of virus samples determined by the different anti-virus engines, and obtaining a second virus sample set according to the intersection; and performing a virus reporting operation according to the second virus sample set.

2. The method of claim 1, further comprising:
   before performing the virus reporting operation according to the first virus sample set, determining, by the client device, the intersection of virus samples respectively determined by the different anti-virus engines, and
   obtaining, by the client device, the second virus sample set according to the intersection of the virus samples;
   the performing the virus reporting operation according to the virus sample set comprises:
   performing, by the client device, the virus reporting operation according to the first virus sample set and the second virus sample set.

3. The method of claim 1, wherein the determining at least one virus sample according to different anti-virus engines comprise:
scanning, by the client device using the different anti-virus engines, files in the client device in series or in parallel to determine the at least one virus sample.

4. A client device for reporting a virus, comprising:
   one or more processors;
   a memory; and
   one or more program modules stored in the memory that when executed by the one or more processors, cause the one or more processors to:
   determine at least one virus sample according to different anti-virus engines;
   determine whether a network connecting the client device and a server is unobstructed, and trigger transmitting sample information of the at least one virus sample to the server if it is determined that the network is unobstructed;
   transmit the sample information of the at least one virus sample to the server, wherein the server determines a first virus sample set to be reported according to the at least one virus sample and a predefined sampling information list in the server, and returns the first virus sample set to the client device; wherein the predefined sample information list comprises a white list and a black list, if the sample information of the at least one virus sample comprises sample information of a first virus sample in the white list, the server determines that the first virus sample is not to be reported; and if the sample information of the at least one virus sample comprises sample information of a second virus sample in the black list, the server determines that the second virus sample is to be reported and puts the second virus sample into the first virus sample set;
   receive the first virus sample set to be reported; and
   perform a virus reporting operation according to the first virus sample set;
   determine an intersection of virus samples respectively determined by the different anti-virus engines of the client device, and determine a second virus sample set according to the intersection; and
   perform the virus reporting operation according to the second virus sample set.

5. The client device of claim 4, wherein the modules further cause the one or more processors to:
   perform the virus reporting operation according to the first virus sample set and the second virus sample set.

6. The client device of claim 4, wherein determining at least one virus sample comprises scanning files in the client device using the different anti-virus engines in series or in parallel.

7. A non-transitory computer-readable storage medium comprising a set of instructions for reporting a virus, the set of instructions to direct at least one processor to perform acts of:
   determining, by a client device, at least one virus sample according to different anti-virus engines;
   determining, by the client device, whether a network connecting the client device and a server is unobstructed;
   if the network is unobstructed, transmitting, by the client device, sample information of the at least one virus sample to the server, such that the server determines a first virus sample set needs to be reported according to the sample information of the at least one virus sample and a predefined sample information list in the server, and returns to the first virus sample set to the client device; wherein the predefined sample information list comprises a white list and a black list; if the sample information of the at least one virus sample comprises sample information of a first virus sample in the white list, the server determines that the first virus sample needs not to be reported; and if the sample information of the at least one virus sample comprises sample information of a second virus sample in the black list, the server determines the second virus sample needs to be reported and puts the second virus sample into the first virus sample set;

receiving, by the client device, the first virus sample set needs to be reported; and performing a virus reporting operation according to the first virus sample set;

if the network is obstructed, determining, by the client device, an intersection of virus samples determined by the different anti-virus engines, and obtaining a second virus sample set according to the intersection; and performing a virus reporting operation according to the second virus sample set.

\* \* \* \* \*